United States Patent [19]

Figlhuber et al.

[11] 4,336,104

[45] Jun. 22, 1982

[54] INSPECTION AND TESTING DEVICE

[75] Inventors: Dietgar Figlhuber; Johannes Gallwas, both of Erlangen; Robert Weber, Uttenreuth; Jakob Weber, Erlangen, all of Fed. Rep. of Germany

[73] Assignee: Kraftwerk Union Aktiengesellschaft, Mülheim, Fed. Rep. of Germany

[21] Appl. No.: 62,067

[22] Filed: Jul. 30, 1979

[30] Foreign Application Priority Data

Aug. 1, 1978 [DE] Fed. Rep. of Germany ....... 2833716

[51] Int. Cl.³ ............................................. G21C 17/00
[52] U.S. Cl. .................................................... 376/249
[58] Field of Search ............... 176/19 R; 73/598, 600, 73/619, 622, 640

[56] References Cited

U.S. PATENT DOCUMENTS

| 3,066,989 | 12/1962 | Camac | 176/19 R |
| 3,085,961 | 4/1963 | Charlesworth | 176/19 R |
| 3,418,207 | 12/1968 | Becker et al. | 176/19 R |
| 3,930,942 | 1/1976 | Thome | 176/19 R |

FOREIGN PATENT DOCUMENTS

| 2506415 | 8/1976 | Fed. Rep. of Germany .... 176/19 R |
| 2544054 | 4/1977 | Fed. Rep. of Germany .... 176/19 R |
| 2620715 | 11/1977 | Fed. Rep. of Germany .... 176/19 R |
| 2636246 | 2/1978 | Fed. Rep. of Germany .... 176/19 R |
| 2709023 | 9/1978 | Fed. Rep. of Germany .... 176/19 R |

OTHER PUBLICATIONS

Kerntecknik, vol. 13, No. 2, (1/71), pp. 54–68.
Kerntecknik, vol. 20, No. 3, (1/78), pp. 114–116, Muller.

Primary Examiner—Sal Cangialosi
Attorney, Agent, or Firm—Herbert L. Lerner

[57] ABSTRACT

Inspection and testing device for the bottoms of reactor pressure vessels, including an insulation layer and a shielding layer enclosing the pressure vessel, a track fitted to the bottom of the pressure vessel having a first part fixed to the bottom of the pressure vessel and a second part detachable from the first part and passing through the insulation and shielding layers, the second part having a substantially horizontal end region disposed outside the shielding layer, and including a testing and inspection device connected to the track for inspecting and testing the bottom of the pressure vessel.

9 Claims, 4 Drawing Figures

INSPECTION AND TESTING DEVICE

The invention relates to an inspection and testing device for the bottom of a cylindrical reactor pressure vessel having a track fitted to the bottom, to which a device for testing and inspection is connected.

In a construction known from U.S. Pat. No. 3,930,942, the track is fastened adjustably to a carriage which in turn can move on a circular track located underneath the bottom of the pressure vessel. The play which is due to the adjustable track on the carriage and is for the movement of the latter on the circular track, is acceptable in the known installation, because the equipment to be guided is a television camera. For other examinations, however, for instance for ultrasonic tests, more accurate and, in particular, reproducible guidance of the equipment is necessary.

It is accordingly an object of the invention to provide an inspection and testing device which overcomes the hereinafore-mentioned shortcomings of the heretofore known devices of this general type.

With the foregoing and other objects in view there is provided, in accordance with the invention, an inspection and testing device for the bottoms of the reactor pressure vessels, comprising an insulation layer and a shielding layer enclosing the pressure vessel, a track fitted to the bottom of the pressure vessel having a first part fixed to the bottom of the pressure vessel and a second part detachable from the first part and passing through the insulation and shielding layers, the second part having a substantially horizontal end region disposed outside the shielding layer, and a testing and inspection device connected to the track for inspecting and testing the bottom of the pressure vessel.

The invention is particularly important when the bottom has pipe nozzles for connecting control rod drives or measuring lines, since their welds must be checked particularly carefully. In this case, the fixed part of the track can run between the projections. The detachable part, which traverses the insulation and the shield, on the other hand, needs to be employed only for the testing process. This means that in normal operation, the insulation and the shield are not interrupted by the track, which makes these layers largely ineffective. Even so, the track is available for the test, so that a test procedure can be performed without employing personnel in the particularly radiation-subjected region of the bottom of the pressure vessel.

In accordance with another feature of the invention, there is provided a plurality of other tracks disposed along side and parallel to the first mentioned track. With such parallel tracks, all areas of the bottom can be covered even if the bottom is occupied by close rows of pipe nozzles.

In accordance with a further feature of the invention, the end regions of the tracks are disposed at opposite sides of the pressure vessel. In this way, as much space as possible is available for the installation and disassembly of a testing device. With the disposition of the track ends on opposite sides, it is also possible to circumvent projections such as nozzles or braces, which would otherwise be in the way of the tracks.

In accordance with an added feature of the invention, the second track part includes a plurality of sections and means for firmly connecting the sections together.

In accordance with an additional feature of the invention, the connecting means are flanges disposed transversely to the longitudinal direction of the tracks. It is possible thereby to also transport longer track sections, which are to be movable, in close quarters such as may only be available in some circumstances in the vicinity of the reactor pressure vessel.

In accordance with yet another feature of the invention, there are provided supporting means associated with the second track part. The supports are connected to the reactor pressure vessel or are disposed in other structures adjacent thereto in such a manner that the track always occupies the same position relative to the reactor pressure vessel in repeated tests.

In accordance with yet a further feature of the invention, there is provided, a cable chain connected to the testing and inspection device, and means connected to said track for guiding the cable chain along the track.

In accordance with yet an added feature of the invention, there is provided a position measurement device associated with the testing and inspection device, and markings on the track for the position measurement device.

In accordance with yet an additional feature of the invention, the position measurement device is a drive for the cable chain.

In accordance with a concomitant feature of the invention, the chain includes links and joints having enough play to allow the chain to follow curves in the track.

Other features which are considered as characteristic for the invention are set forth in the appended claims.

Although the invention is illustrated and described herein as embodied in an inspection and testing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
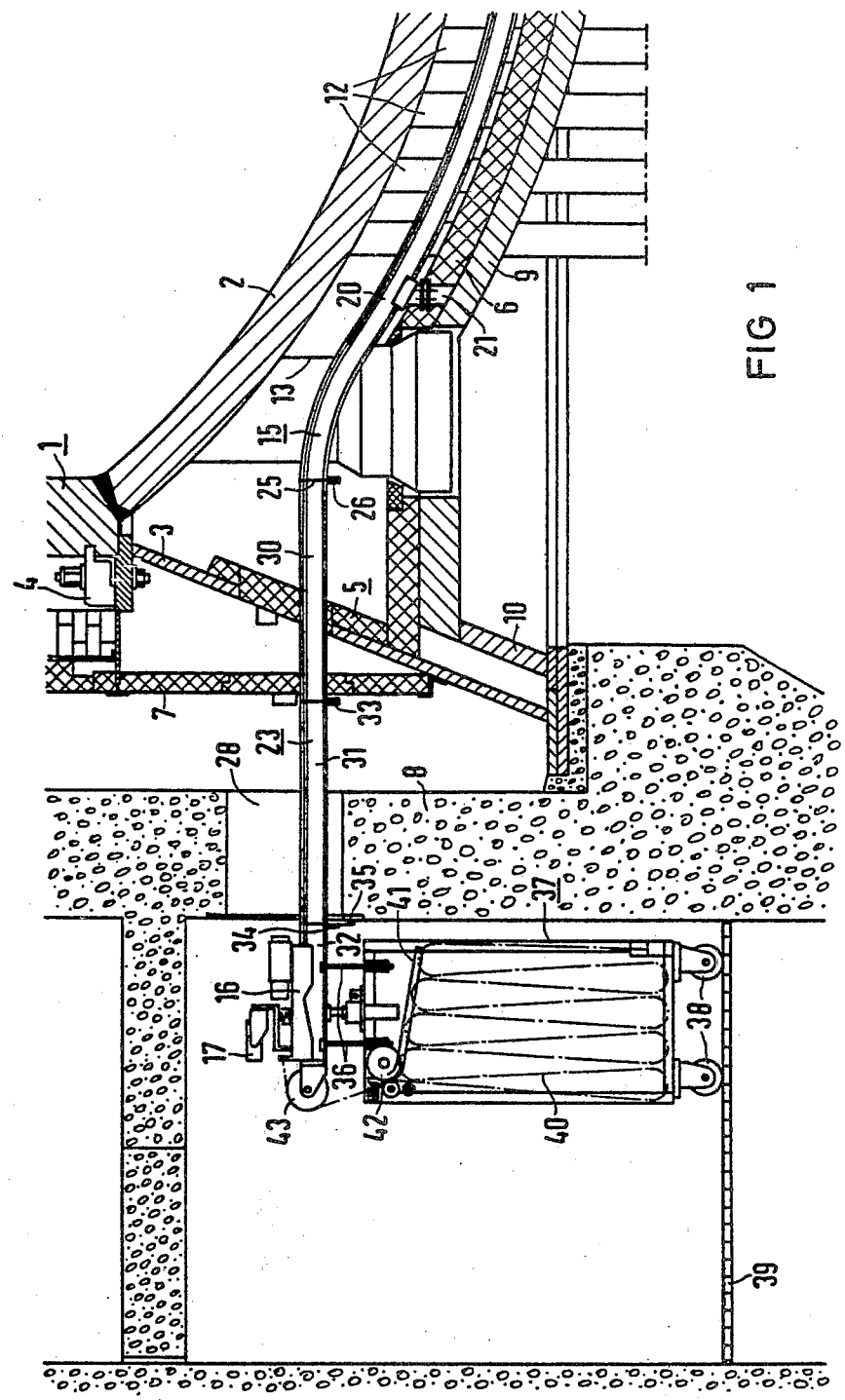
FIGS. 1 and 2 are fragmentary diagrammatic elevational orthogonal views of a portion of the lower part of a reactor pressure vessel in accordance with the invention.

Referring now to the figures of the drawing and first, particularly, to FIG. 1 thereof, there is seen a steel reactor pressure vessel 1 of a boiling-water reactor for, say, 1000 MWe, including a cylindrical shell which is closed at the bottom by a convex bottom 2. For support there is provided a so-called support skirt 3, to which the reactor pressure vessel 1 is clamped by means of a clamping connection 4. On the inside of the support skirt, thermal insulation 5 is provided, and is continued underneath the bottom 2 in a curved layer 6. On the outside of the support skirt 3, a further thermal insulation layer 7 is provided, which surrounds the cylindrical reactor pressure vessel 1 as an outer cylinder. As a further enclosure, a concentrically disposed concrete cylinder 8 is provided, which forms a radiation shield. For the same purpose, a dished steel plate 9 with a support in the form of a truncated cone 10 is disposed underneath the bottom 2, inside the support skirt 3.

On its underside, the reactor pressure vessel 1 carries a multiplicity of pipe nozzles 12. The control rod drives which are not shown in detail are fastened there. In addition, eight pipe nozzles 13 which have a substantially larger diameter than the pipe nozzles 12, are welded to the outer rim of the bottom 2 and distributed over the circumference thereof. The pipe nozzles 13 accommodate internal axial pumps which pump the coolant in a closed circuit within the boiling-water reactor. As can be seen from the figure, the bottom 2 of the reactor pressure vessel 1 is thereby covered with projections overall, to a large extent. To nevertheless allow the testing of the particularly sensitive welds of the pipe nozzles 12 and 13, a multiplicity of parallel tracks 15 is provided, on which a carriage 16 with an ultrasonic testing system 17 can run.

The tracks 15 are disposed between two respective rows of pipe nozzles 12. They include a fixed curved part 20, which is fitted to the bottom 2 and is supported or conducted by rigid supports 21 at the steel plate 9 disposed underneath the bottom, and part 23 which is detachable and then movable. The fixed track part 20 extends to the end 25 underneath the cylindrical part of the reactor pressure vessel, as shown in FIG. 1. At the end 25, the track parts 20 and 23 are joined together by a fast-acting clamping device 26 which can be operated by tools from the outside of the support skirt 3 and preferably, from outside the shield 8.

During normal operation, the track part 23 is removed. Therefore, the cutout in the thermal insulation 5 as well as that in the thermal insulation 7 and the cutout 28 in the shield 8 can remain closed. Only after the reactor is shut down, i.e. after it has cooled down and the radiation has been reduced, are cutouts in the above-mentioned insulations and shields opened. Then the detachable track part 23, which in turn includes three sections 30, 31 and 32, is inserted. The sections can be bolted together by means of flange connections 33 and 34 or can likewise be joined together by fast-acting clamping devices. The joint 34 serves along with a further screw connection 35 as a stationary support at the shield 8.

Figure 3:
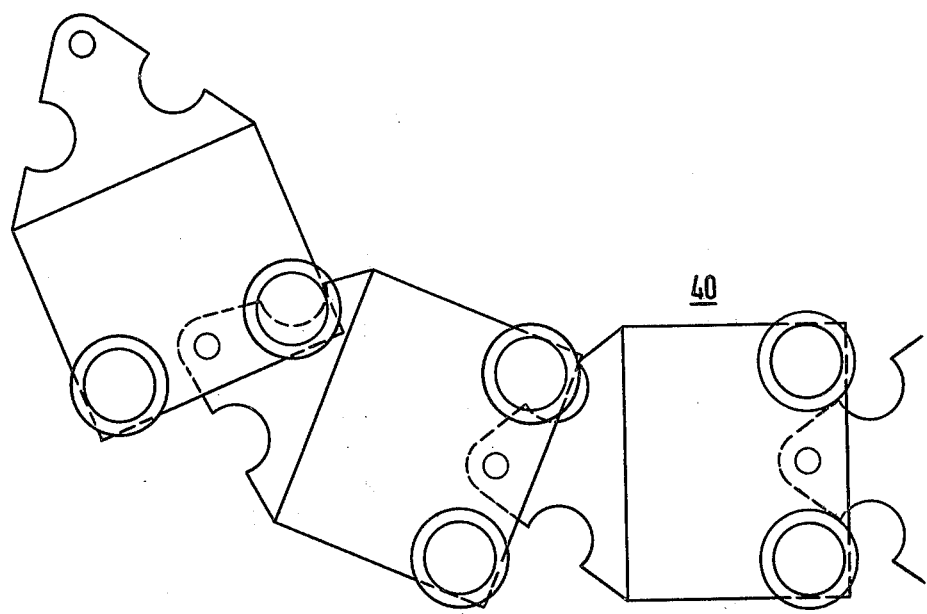
FIGS. 3 and 4 show in an enlarged scale two views of a cable-trailing chain, mounted on a track.
Figure 4:
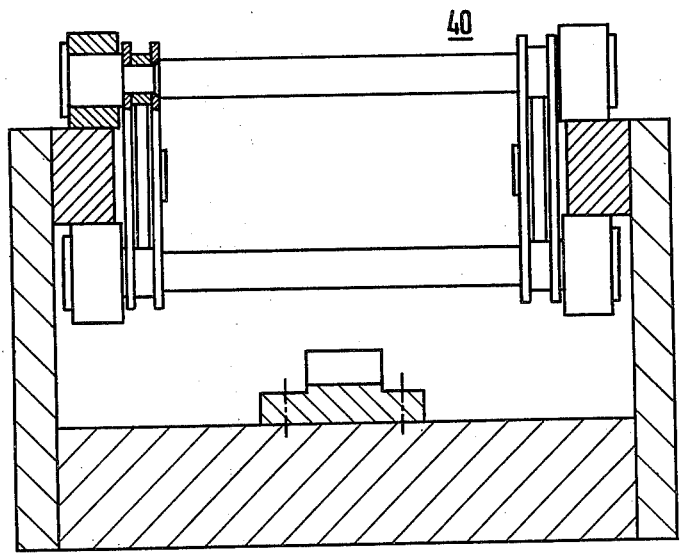

The outermost horizontal tract section 32 serves for mounting and dismounting the carriage (or slide) 16. It is connected by screws 36 which serve for adjusting the height relative to a compact transfer carriage 37 which rolls on wheels 38 on a stage 39. The carriage 37, which could also be guided on tracks on the outside of the shield 8, serves as a cable-trailing chain storage device. The cable-trailing chain is indicated by dot-dash lines 40. The chain 40 is brought by a bar 41 to a drive wheel 42 and from there, past a guide roller 43, to the slide 16. The drive wheel 42 acts as a position measurement device by measuring the movement of the cable-trailing chain, for instance by counting its rotations. The drive wheel 42 moves the cable-trailing chain 40 with the power supply and measuring lines for the slide 16 fastened thereto, and the ultrasound testing system 17, synchronously with the movement of the slide 16; guide elements can form a connection which ist shown in FIGS. 3 and 4, with the track 15, which lets the cable-trailing chain 40 follow curves in the track as well as straight portions. The cable chain 40 is made with conventional links and joints having enough play to allow the chain to follow curves in the track 15.

Figure 2:
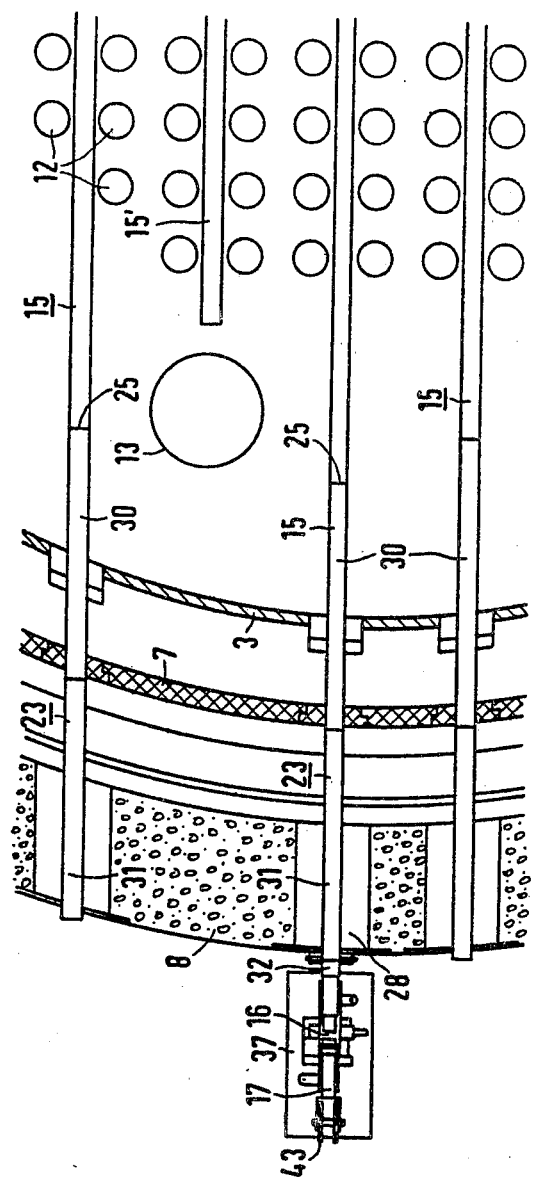

FIG. 2, which is shifted 90° from the view of FIG. 1, shows that not all tracks 15 are accessible by the carriage 37 from the same side of the reactor pressure vessel 1. Because of the pump nozzle 13, the track 15' is brought out from the bottom space of the reactor pressure vessel 1 to the other non-illustrated side. Otherwise, it may be advantageous in some circumstances, in view of the connections of the carriage 36, to bring out the tracks 15 alternatingly to one or the other side.

We claim:

1. Inspection and testing device for the bottom of nuclear reactor pressure vessels, comprising an insulation layer and a shielding layer enclosing the pressure vessel, a plurality of parallel tracks fitted to the bottom of the pressure vessel, each track having a plurality of sections and means for firmly connecting said sections together, each track having a first part fixed to the bottom of the pressure vessel and a second part detachable from said first part and passing through a closable opening formed in said insulation and shielding layers, said second parts having substantially horizontal end regions disposed outside said shielding layer, and a testing and inspection device connected to said tracks for inspecting and testing the bottom of the pressure vessel.

2. Inspection and testing device according to claim 1, wherein said end regions of said tracks are disposed at opposite sides of the pressure vessel.

3. Inspection and testing device according to claim 1, wherein said connecting means are flanges disposed transversely to the longitudinal direction of said tracks.

4. Inspection and testing device according to claim 1, including supporting means associated with said second track part.

5. Inspection and testing device according to claim 1, including a cable chain connected to said testing and inspection device, and means connected to said track for guiding said cable chain along said track.

6. Inspection and testing device according to claim 1, including a position measurement device associated with said testing and inspection device, and markings on said track for said position measurement device.

7. Device according to claim 6, wherein said position measurement device is a drive for said cable chain.

8. Device according to claim 5, 6 or 7, wherein said cable chain includes links and joints having enough play to allow said chain to follow curves in said track.

9. Device according to claim 1, wherein said testing and inspection device is an ultrasonic testing and inspection device.

* * * * *